(12) United States Patent
Fonnum et al.

(10) Patent No.: US 6,984,702 B2
(45) Date of Patent: Jan. 10, 2006

(54) PROCESS FOR THE PREPARATION OF FUNCTIONALIZED POLYMER PARTICLES

(75) Inventors: Geir Fonnum, Fjellhamar (NO); Ellen Weng, Oppegård (NO); Elin Marie Aksnes, Oslo (NO); Rolf Nordal, Skedsmokorset (NO); Preben Cato Mørk, Trondheim (NO); Svein Tøgersen, Oslo (NO); Julian Cockbain, London (GB)

(73) Assignee: Dynal Biotech ASA, Oslo (NO)

( * ) Notice: Subject to any disclaimer, the term of this patent is extended or adjusted under 35 U.S.C. 154(b) by 0 days.

(21) Appl. No.: 10/239,492

(22) PCT Filed: Mar. 1, 2001

(86) PCT No.: PCT/GB01/01278

§ 371 (c)(1),
(2), (4) Date: Dec. 24, 2002

(87) PCT Pub. No.: WO01/70825

PCT Pub. Date: Sep. 27, 2001

(65) Prior Publication Data

US 2003/0109657 A1 Jun. 12, 2003

(30) Foreign Application Priority Data

| Mar. 22, 2000 | (GB) | ................................. | 0007005 |
| Sep. 20, 2000 | (GB) | ................................. | 0023070 |
| Sep. 27, 2000 | (GB) | ................................. | 0023673 |

(51) Int. Cl.
C08F 2/18 (2006.01)
C08F 257/00 (2006.01)
C08F 112/08 (2006.01)
C08F 285/00 (2006.01)

(52) U.S. Cl. .................. 526/73; 524/458; 526/75; 526/201; 526/310

(58) Field of Classification Search ............... 524/458; 526/73, 75, 201, 310
See application file for complete search history.

(56) References Cited

U.S. PATENT DOCUMENTS 4,530,956 A 7/1985 Ugelstad et al. ............ 524/548

FOREIGN PATENT DOCUMENTS

| EP | 0 003 905 | 9/1979 |
| WO | WO 99/19375 | 4/1999 |
| WO | WO 9919375 A1 * | 4/1999 |

OTHER PUBLICATIONS

Lewandowski et al. ("Preparation of Macroporous, Monodisperse, Functionalized Styrene . . . " in Journal of Applied Polymer Science, vol. 67, pp. 597-607 (1998) XP002168638.*

Galia et al. ["Monodisperse Polymer Beads . . . " in Journal of Applied Polymer Science vol. 32, pp. 2169-2175 (1994)].*

Lewandowski, Kevin et al. "Preparation of Macroporous, Monodisperse, Functionalized Styrene . . . " XP002168638, 1998, vol. 67, pp. 597-607.

(Continued)

*Primary Examiner*—Kelechi C. Egwim
(74) *Attorney, Agent, or Firm*—Ohlandt, Greeley, Ruggiero & Perle

(57) ABSTRACT

A process for the preparation of amine-functionalized vinyl polymer particles which process comprises suspension polymerizing aminostyrene together with at least one other vinylic monomer and optionally a crosslinking agent.

13 Claims, 2 Drawing Sheets

OTHER PUBLICATIONS

Galia, Marina et al. "Momodisperse Polymer Beads . . . " vol. 32, 1994, pp. 2169-2175.

Sinyavs'Kii, V.G. et al. "Polymerization and copolymerization . . . " vol. 8, XP002168639, 1963.

* cited by examiner

PROCESS FOR THE PREPARATION OF FUNCTIONALIZED POLYMER PARTICLES

FIELD OF THE INVENTION

The present invention relates to a process for the preparation of functionalised polymer particles, in particular amine functionalised polystyrene particles.

DISCUSSION OF THE BACKGROUND ART

Functionalised polymer particles are useful for chromatography and other separation processes, as the solid phase for solid phase organic synthesis, particularly synthesis of oligopeptides, oligonucleotides and small organic molecules, e.g. in combinatorial chemistry, and as supports for catalysts and reagents, e.g. for diagnostic assays.

Generally the preparation of amine functionalised particles has involved copolymerization of two or more monomers one of which has a functional group which is transformable to an amine group or to which an amine group may be coupled after polymerization is complete. As a result the distribution of the amine groups throughout the amine functionalised particle is generally non-uniform and less than optimal.

We have now found that amine functionalised polymer particles can be prepared directly by suspension polymerization of aminostyrene, preferably 4-aminostyrene, together with at least one further vinylic monomer, especially a styrenic monomer, and, optionally, a cross-linking agent.

SUMMARY OF THE INVENTION

Thus viewed from one aspect the invention provides a process for the preparation of amine-functionalised vinylic, especially styrenic, polymer particles which process comprises suspension (or dispersion) polymerizing aminostyrene (e.g. 4-aminostyrene) together with at least one other vinylic monomer (e.g. a styrenic monomer such as styrene) and optionally a crosslinking agent (e.g. divinyl benzene).

The amine functionalised particles produced by the process of the invention may be reacted further to couple further chemical functions to the amine groups or to transform the amine groups into other nitrogen attached functional groups.

Viewed from a further aspect the invention provides the use of amine functionalized vinylic, especially styrenic polymer particles produced by the process of the invention in separations and syntheses, e.g. as supports for solid phase synthesis or for catalysts or as chromatographic separators.

In these uses, the particles may be used in the manners conventional for functionalized particles.

The suspension polymerization of the invention is preferably a seeded suspension polymerization (e.g. as described in WO99/19375) in which a styrene compatible polymer seed (e.g. a polystyrene seed) is grown during the suspension polymerization, optionally in a series of expansion steps, e.g. to a mode particle size of 20 to 2000 $\mu$m. The disclosures of WO99/19375 are hereby incorporated by reference.

More preferably the suspension polymerization process is a seeded suspension polymerization in which the seed is swollen before polymerization is initiated and in which continuous or batchwise monomer addition continues during the suspension polymerization phase. Seed swelling is preferably effected using a technique similar to that developed by the late Professor John Ugelstad and described in EP-B-3905 and U.S. Pat. No. 4,530,956, the contents of which are also incorporated by reference.

Thus polymer beads may be produced by diffusing a monomer and a polymerization initiator (or catalyst) into polymer seeds in an aqueous dispersion. The seeds swell and following initiation of polymerization, e.g. by heating to activate the initiator, larger polymer particles are produced. The maximum volume increase due to swelling and polymerization is normally about ×5 or less. The late Professor John Ugelstad found that the capacity of the seeds to swell could be increased to a volume increase of ×125 or even more if an organic compound with relatively low molecular weight and low water solubility is diffused into the seeds before the bulk of the monomer is used to swell the seeds. The effect is based on entropy rather than particularly on the chemical nature of the organic compound. Conveniently the polymerization initiator may be used for this purpose. Organic solvents, e.g. acetone or a portion of the monomer, may be used to enhance diffusion of the organic compound into the seeds. This "Ugelstad polymerization process", which is described for example in EP-B-3905 (Sintef) and U.S. Pat. No. 4,530,956 (Ugelstad), may be used to produce monodisperse particles, if necessary carrying out several swelling and polymerization stages to reach the desired particle size.

In a simplified version of the Ugelstad process the enhanced capacity for swelling may be achieved simply by the use of oligomeric seed particles, e.g. where the oligomer weight average molecular weight corresponds to up to 50 monomer units or up to 5000 Daltons.

DETAILED DESCRIPTION OF THE PREFERRED EMBODIMENT

Figure 1:
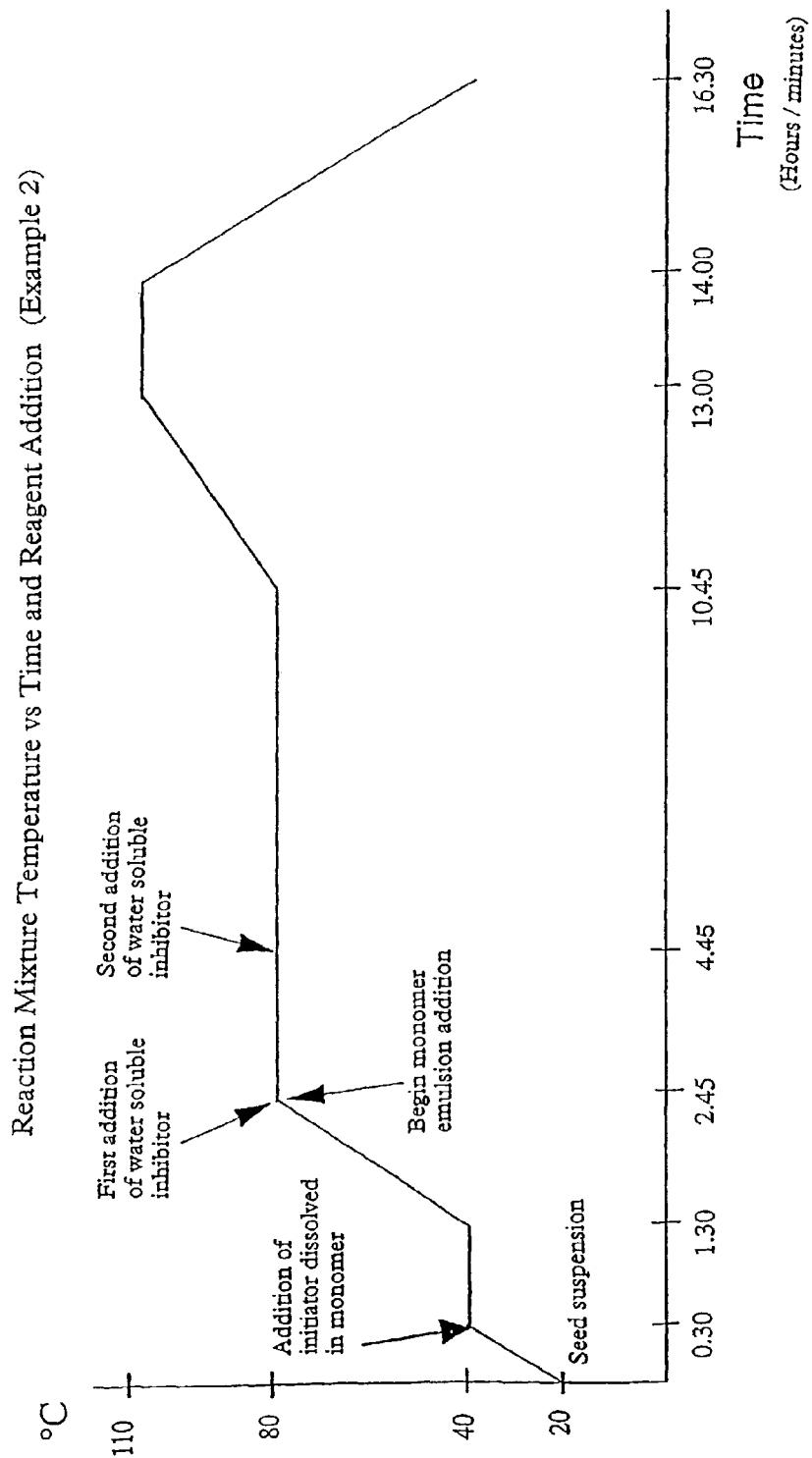
FIG. 1 is a graph plotting reaction mixture temperature versus time and reagent addition for Example 2.
Figure 2:
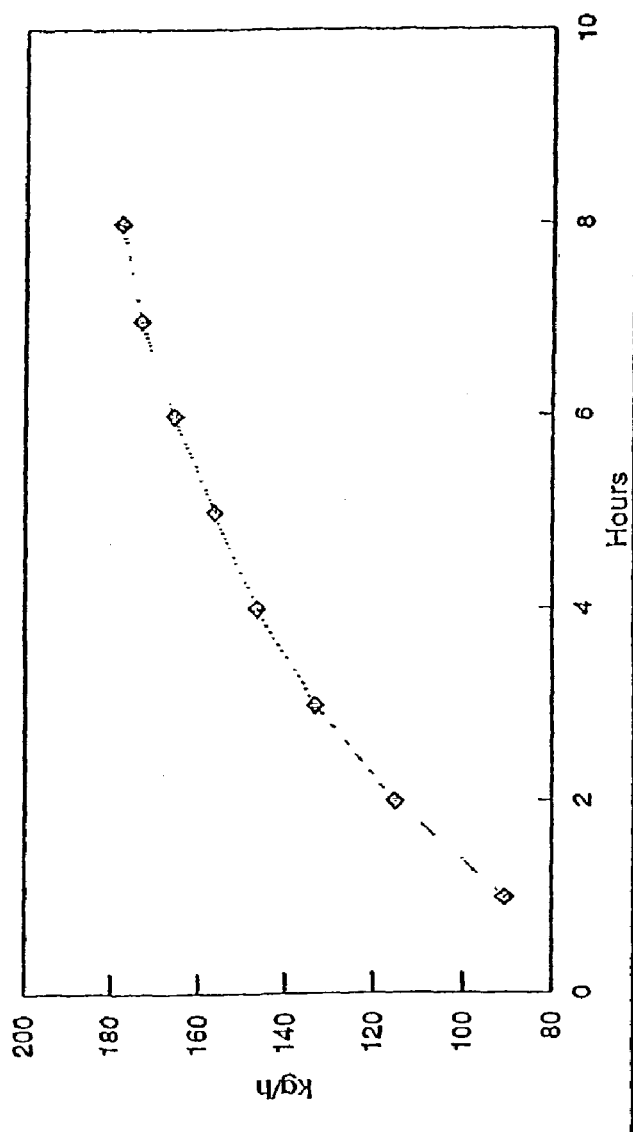
FIG. 2 is a graph plotting monomer addition rate for Example 2.

Thus in one embodiment the invention provides a process for the preparation of amine functionalised polymer particles, preferably having a mode particle size of at least 20 $\mu$m, more preferably at least 50 $\mu$m, still more preferably at least 70 $\mu$m, e.g. at least 120 $\mu$m, which process comprises (a) obtaining a first particulate polymer seed material (having in one embodiment a mode particle diameter of no more than 50 $\mu$m, preferably no more than 40 $\mu$m, more preferably no more than 30 $\mu$m);

(b) using said first seed material, performing a suspension polymerization to yield a second particulate polymer seed material having a mode particle diameter greater than that of said first seed material, and, if required, using said second seed material, performing at least one further suspension polymerization to yield a particulate polymer seed material, e.g. having a mode size greater than 20 $\mu$m, preferably greater than 50 $\mu$m, more preferably greater than 70 $\mu$m, still more preferably greater than 120 $\mu$m, whereby the increase in mode particle diameter in step (b) is at least ×2, preferably ×4, more preferably at least ×10, e.g. ×10 to ×15; and (c) optionally impregnating and/or heat treating and/or surface modifying the particulate product of step (b);
characterised in that at least one of the suspension polymerizations effected in step (b), preferably at least the final suspension polymerization effected in step (b), involves (i) forming an aqueous dispersion comprising a polymer seed material, an organic compound (e.g. a polymerization initiator) which has a molecular weight of less than 5000 Daltons and a water solubility of less than $10^{-2}$ g/L at 25° C., a stabilizer and optionally an organic solvent (e.g. acetone or a portion of the monomer mentioned below);

(ii) allowing said organic compound to diffuse into the seed material to produce an activated seed material; and (iii) contacting said activated seed material with a monomer and with a polymerization initiator and effecting suspension polymerization thereof, and in that in at least the final suspension polymerization of step (b) the monomer comprises amino styrene, preferably 4-aminostyrene and at least one further vinylic monomer (e.g. a styrenic monomer such as styrene).

In one embodiment, for the production of larger particles, e.g. having a mode particle size of at least 100 µm, preferably at least 120 µm, e.g. up to 2000 µm, the process comprises (a) obtaining a first particulate polymer seed material having a mode particle diameter of at least 70 µm, preferably at least 80 µm, more preferably at least 90 µm;

(b) using said first seed material, performing a suspension polymerization to yield a second particulate polymer seed material having a mode particle diameter greater than that of said first seed material, and, if required, using said second seed material, performing at least one further suspension polymerization to yield a particulate polymer seed material having a mode size greater than 100 µm, preferably greater than 120 µm, more preferably greater than 200 µm, whereby the increase in mode particle volume in step (b) is at least ×2, preferably ×4, more preferably ×10 to ×15; and (c) optionally impregnating and/or heat treating and/or surface modifying the particulate product of step (b);

characterised in that at least one of the suspension polymerizations effected in step (b), preferably at least the final suspension polymerization effected in step (b), involves (i) forming an aqueous dispersion comprising a polymer seed material, an organic compound (e.g. a polymerization initiator) which has a molecular weight of less than 5000 Daltons and a water solubility of less than $10^{-2}$ g/L at 25° C., a stabilizer and optionally an organic solvent (e.g. acetone or a portion of the monomer mentioned below);

(ii) allowing said organic compound to diffuse into the seed material to produce an activated seed material; and (iii) contacting said activated seed material with a monomer and with a polymerization initiator and effecting suspension polymerization thereof, and in that in at least the final suspension polymerization of step (b) the monomer comprises amino styrene, preferably 4-aminostyrene and at least one further vinylic monomer (e.g. a styrenic monomer such as styrene).

In the process of the invention, where said monomer is an amine functionalised monomer (or where two or more monomers are used and one or more of these comonomers is/are amine-functionalised monomers), it is preferred to add the initiator after the seed material has been activated and thus to use as the organic compound (i.e. substance I of EP-B-3905) a non-initiator, e.g. a material such as dioctyl adipate.

In the process of the invention, the seeds and the final product are preferably substantially monodisperse.

In the process of the invention, the seed activation stage (steps (i) and (ii)) preferably involves producing an aqueous dispersion of polymer seed which also is an "oil-in-water" emulsion of the organic compound, preferably a polymerization initiator such as dibenzoyl peroxide. The uptake of the organic compound by the polymer seeds may be assisted by the use of an organic solvent in which the organic compound is soluble, e.g. a solvent such as a ketone (e.g. acetone), alkanol, ether, etc. or more preferably a vinylic monomer such as a styrene. Where the organic compound is a polymerization initiator, and especially where a monomer is used as a solvent, formation step (i) is preferably effected at a temperature below the activation temperature for the initiator so as to prevent formation of new particles, e.g. at a temperature between 10 and 65° C., preferably between 20 and 55° C., more preferably 25 and 50° C., especially preferably between 30 and 45° C.

Following organic compound uptake, the temperature of the dispersion is preferably raised to a level at which the polymerization initiator is active, e.g. 60 to 100° C., preferably 70 to 95° C., more preferably 75 to 90° C. and the monomer is added, preferably as an aqueous emulsion or as a single monomer phase. For the production of particles with mode sizes up to 80 µm, it is preferred to add the monomer as an aqueous emulsion; for the production of particles with mode sizes above 40 µm, more especially above 80 µm and particularly above 100 µm (e.g. up to 1500 µm), it is convenient to add the monomer as a single phase material.

For both organic compound and monomer, emulsion formation is preferably effected using an intensive mixer, e.g. a rotor-stator mixer such as an Ultra-Turrax homogenizer, such that emulsion droplets are less than 15 µm, more preferably less than 10 µm in mode diameter.

The polymerization medium preferably contains a polymerization inhibitor in the aqueous phase, e.g. potassium iodide, in order to prevent formation of new particles. Use of a polymerisation inhibitor is especially preferable when working with polymerisation media comprising particles smaller than 80 µm. This can be added at the beginning of the polymerization stage (i.e. when monomer is added or when the bulk of the monomer begins to be added), however it is preferable to add further inhibitor during polymerization.

Monomer and initiator addition is preferably effected over a prolonged period, e.g. 1 to 15 hours, preferably 1 to 10 hours, more preferably 1 to 8 hours and the rate of monomer addition may be constant but preferably is increased over that period. Such addition may be batchwise but more preferably is continuous. During addition, the polymerization mixture is preferably stirred.

In at least a final polymerization cycle of the process of the invention, the temperature of the polymerization mixture is preferably increased, e.g. by 10 to 40° C., preferably by 25 to 35° C., towards the end of the polymerization stage to reduce the level of unreacted monomer. The temperature increase is preferably about 0.1 to 2.0° C./min, more preferably 0.2 to 1.0° C./min, and the polymerization mixture is advantageously held at the elevated temperature until analysis shows substantial disappearance of unreacted monomer, e.g. for 30 to 120 minutes.

The monomer, as mentioned above is preferably added as an oil-in-water emulsion; this emulsion preferably comprises water, monomer, initiator (e.g. Trigonox 117 and BPO), and surfactant (e.g. a poloxamer or ethoxylated sorbitan ester surfactant such as Tween 20).

In one preferred embodiment of the process of the invention, especially suitable for production of particles with a mode particle size of 50 to 120 μm or greater, a polymer seed activation and polymerization cycle involves the following steps:

(a) form an aqueous dispersion of polymer seeds containing in the aqueous phase a steric stabilizer (e.g. a cellulose ether or an inorganic compound such as tricalcium phosphate (TCP)) and optionally a surfactant (for example Naccanol);

(b) bring the dispersion to 38 to 42° C. and mix in a solution of initiator in monomer (e.g. styrene) using moderate mixing;

(c) allow the initiator and optionally said monomer to diffuse into the seeds, e.g. for 30 to 120 minutes, preferably about 60 minutes;

(d) bring the "activated" dispersion to a temperature at which the initiator is activated (e.g. 60 to 95° C., preferably 70 to 90° C.), and add an aqueous solution of a polymerization inhibitor (e.g. KI) and begin continuous addition of an emulsion of water, monomer, stabilizer, polymerization initiator and, optionally, an oil-soluble polymerization initiator, and inhibitor;

(e) continue addition of the monomer emulsion, optionally adding further water-soluble inhibitor one or more times; and optionally (f) bring the polymerization mixture to a higher temperature, e.g. 90 to 100° C., to deplete monomer (preferably after monomer addition is completed).

In an alternative embodiment of the process of the invention especially suitable for the production of particles having a mode particle size of at least 100 μm from seeds having a mode particle size of at least 70 μm, a polymer seed activation and polymerization cycle involves the following steps:

(a) form an aqueous dispersion of polymer seeds containing in the aqueous phase a steric stabilizer (e.g. a cellulose ether or an inorganic compound, such as tricalcium phosphate) and optionally a surfactant (for example Naccanol);

(b) bring the dispersion to 38 to 42° C. and mix in a solution of initiator in monomer (e.g. styrene) using moderate mixing;

(c) allow the initiator and optionally said monomer to diffuse into the seeds, e.g. for 30 to 120 minutes, preferably about 60 minutes;

(d) bring the "activated" dispersion to a temperature at which the initiator is activated (e.g. 60 to 95° C. preferably 70 to 90° C.) and begin continuous addition of monomer and optionally also initiator, and (after a period of up to 150 minutes polymerization, e.g. 60 to 100 minutes) initiator; and optionally (e) bring the polymerization mixture to a higher temperature, e.g. 90 to 100° C., to deplete monomer (preferably after monomer addition is completed).

Such activation and polymerization cycles may be repeated to produce polymer particles of the desired size. Preferably, each such cycle will involve a particle volume increase of at least ×5. Thus for example initial polymer seeds with a mode diameter of 20 μm may conveniently be transformed in two polymerization cycles, first to a mode diameter of 40 μm and then to a mode diameter of 80 μm. Preferably the seeds are expanded this way from 5 to 25 μm to 70 to 90 μm (e.g. in 2 or 3 expansion cycles) and from 70 to 90 μm to 200 to 2000 μm (e.g. in 2 to 5 expansion cycles).

In the process of the invention, step (b) may, but preferably does not, involve removal of over- or under-sized particle's from the seed material so produced so as to yield a substantially monodisperse seed material.

The total number of suspension polymerization stages used in the process of the invention will typically be up to 12, preferably up to 8. Typically transition from below 50 μm to above 500 μm will require more than one stage, generally two or more preferably three or four stages. Conveniently, for seeds having sizes above 100 μm the particle volume growth per stage will be at least ×2.74, e.g. at least ×4, and less than ×60, preferably less than ×30, preferably from ×5 to ×25, e.g. ×5 to ×15. For seeds having sizes below 100 μm, the particle volume growth per stage will preferably be between ×2.74 and ×50, e.g. ×4 to ×40 more preferably between ×5 and ×30, especially preferably ×6 to ×15, e.g. about ×8.

In an especially preferred embodiment of the invention, seeds are swollen by direct addition of a large quantity of monomer, e.g. a quantity of about 50 to 200 times the seed weight, preferably 80 to 120, still more preferably 90 to 110 times. This should be done below the polymerization initiation temperature, e.g. at ambient temperature, and an extended pre-swell produces heavily swollen (e.g. at least about ×25) particles which can then be suspension polymerized by increasing the temperature to initiate polymerization. When polymerization has progressed to the stage where the particles have a residual monomer content of up to 30% by weight, more preferably up to 25% by weight, conveniently about 20 to 25%, further monomer and initiator are added gradually to allow the particles to grow further. In this way an overall growth of up to about ×1500, more preferably up to ×600 may be achieved in the same reactor. Thus for example a 70 to 90 μm seed can be expanded to a 600 to 900 μm particle size. By swelling with such a large quantity of monomer in this way the particles can be swollen through the sticky state while they are well spaced apart and thus the good product size distribution can be maintained.

Thus the initial seed to final particle procedure can be optimized by balancing the length of pre-swelling phases and the number of polymerization stages required. In this way one can reduce the amount of aqueous phase additives required (and hence reduce costs), increase yield, reduce production time, increase production capacity, reduce the number of reactors required, reduce reactor down-time, etc.

If desired, a mixture of two or more populations of substantially monodisperse seeds having different mode diameters may be used in the present invention to produce a multimodal, preferably a bimodal, end product.

By mode particle size is meant the peak particle size for detectable particles, observed in the particle size distribution determined using particle size determination apparatus such as a Coulter LS 130 particle size analyzer e.g. a mode particle size in the distribution of particle size against percentage of total particle volume.

By substantially monodisperse it is meant that for a plurality of particles (e.g. at least 100, more preferably at least 1000) the particles have a coefficient of variation (CV) of less than 20%, for example less than 15%, preferably less than 12%, more preferably less than 11%, still more preferably less than 10% and most preferably no more than about 8%. CV is determined in percentage as $$CV = \frac{100 \times \text{standard deviation}}{\text{mean}}$$

where mean is the mean particle diameter and standard deviation is the standard deviation in particle size. CV is preferably calculated on the main mode, ie. by fitting a monomodal distribution curve to the detected particle size distribution. Thus some particles below or above mode size may be discounted in the calculation which may for example be based on about 90%, or more preferably about 95%, of total particle number (of detectable particles that is). Such a determination of CV is performable on a Coulter LS 130 particle size analyzer.

The degree of monodispersity required for the seeds and enlarged particles of each enlargement stage tends to vary as enlargement progresses. For the initial and early stage seeds, a high degree of monodispersity is desirable and grading of the product may also be desirable. Thus in general if the product of a polymerization stage has a CV of about 25%, it will preferably be graded to produce a seed having a CV of less than 25%, preferably less than 20% for the subsequent stage. For seeds having a mode size of less than 150 $\mu$m, the CV is especially preferably below 5%. For seeds having a mode size of greater than 150 $\mu$m the CV is preferably at or below about 10%.

Although less preferred, the process of the invention can be carried out using a seed material which is non-monodisperse, e.g. having a CV of up to 50%. In this regard commercially available polymer particles (e.g. polystyrene particles), prepared for example by conventional suspension or dispersion polymerization, may be used.

The separate polymerization stages in the process of the invention may be carried out in different reactor chambers or carried out in the same reactor chamber but with addition of further monomer and desirably also further suspension medium. The further monomer is preferably added continuously until the desired amount of monomer has been added. This addition may be at a constant rate but more preferably the rate of addition is increased as addition progresses, with the increase being either gradual or stepwise.

The initial substantially monodisperse polymer seed material usable for the processes of the invention may conveniently be produced by any process which yields a substantially monodisperse polymer product, e.g. by a dispersion polymerization process performed in an organic solvent or, more preferably, by the Ugelstad (Sintef) process described for example in U.S. Pat. No. 4,336,173 and U.S. Pat. No. 4,459,378. Monodisperse polymer particles produced by the Ugelstad process are sold commercially by Dyno Specialty Polymers AS, of Norway under the trade name Dynospheres®, typically with mode particle sizes in the range 2 to 30 $\mu$m.

The Ugelstad process is an "activated swelling" process rather than a suspension polymerization because polymerization is only initiated after all the monomer has been absorbed into the starting polymer seeds. In contrast, as described herein, in a seeded suspension polymerization the growing seed is continuously contacting fresh monomer and initiator.

Less preferably, the initial polymer seed material may be produced by a process which yields a polydisperse product, e.g. a conventional suspension polymerization process, if desired with the polydisperse product then being size separated to yield a substantially monodisperse particle population.

Initial monodisperse seed particles may be transformed into larger substantially monodisperse polymer seeds by a suspension polymerization process substantially as described in U.S. Pat. No. 5,147,937 (Frazza), with the number and duration of the individual polymerization stages being selected to yield a final substantially monodisperse seed product of the desired mode particle size. In general the desired mode particle size for the final seed product will conform to a size from which the final suspension polymerization product may be produced with the desired median particle size in one, or less preferably more than one, polymerization stages in a single reactor. Thus final seed mode sizes may typically be within±10% of 170 $\mu$m, 340 $\mu$m, 600 $\mu$m and 925 $\mu$m for the manufacture of final product beads of mode sizes of for example 400, 600, 1000 and 1300 $\mu$m, i.e. suitable for different end uses.

It is particularly surprising that the substantial monodispersity of the particles is maintained despite the degree of particle growth that occurs, e.g. multistage growth from initial micron-sized Ugelstad particles up to millimeter sized end product.

It has been found that this multistage growth is advantageous since the polymerization process conditions can be separately optimized for each growth stage, and it allows the final growth stage to be effected using process conditions and controls conventional in the suspension polymerization production of millimeter sized particles.

However, using multistage suspension polymerization to achieve the growth process, not only is the monodispersity substantially retained but also the expense of the Ugelstad process is diluted—thus a 1 g of a 20 $\mu$m Ugelstad product can be transformed into about 275 kg of a 1300 $\mu$m end product.

The processes and products of the invention will now be described in further detail using by way of example the aminostyrene/styrene polymerization system. However, the processes are applicable to other vinylic, especially styrenic comonomers and non-styrenic polymers may serve as the polymer seeds.

The initial seed particles used are preferably polystyrene particles such as Dynospheres® (Dyno Specialty Polymers AS, Lillestrøm, Norway) produced by the Sintef process, particularly preferably particles having a mode size in the range 0.5 to 50 $\mu$m, especially 5 to 30 $\mu$m, and most especially about 10–20 $\mu$m. Alternatively they may be size fractionated polystyrene particles produced by standard emulsion polymerization procedures, e.g. having a mode size of 0.05 to 1.0 $\mu$m, or polystyrene particles having a mode size of up to 20 $\mu$m, more particularly 1 to 10 $\mu$m, produced by dispersion polymerization in an organic solvent. The initial seed particles may then be enlarged to produce final seed particles having a mode size of up to 1000 $\mu$m in a stepwise suspension polymerization process of which at least one stage involves an activation step as described above. One or more of the polymerization stages may however be substantially as described in U.S. Pat. No. 5,147,937.

The process of U.S. Pat. No. 5,147,937 involves combining an aqueous dispersion of the seed particles with an aqueous emulsion of a water-insoluble monomer or monomer mixture and an oil soluble free radical polymerization initiator or a precursor therefor at such a rate that an amount of monomer or monomer mixture equal to the total initial seed polymer weight is combined with the dispersion over a period of 45 to 120, preferably 60 to 90, minutes. The combination is preferably effected at a temperature at least as high as that at which the initiator or precursor is activated and the reaction mixture is maintained at a temperature at which the initiator or precursor is activated until the seeds have grown by the desired amount, suitably until the monomer is exhausted. The procedure is then repeated until the final desired particle size is achieved.

In the process of the invention, particularly preferably, the monomer content of the reaction mixture is maintained at no more than 20%, more preferably no more than 10%, by weight of the polymer content at any given time.

Preferably each growth stage increases the particle volume by 1.1× to 1000×, e.g. 1.5× to 60×, more preferably 2× to 50×, especially 2× to 30× (e.g. 3× to 30×), more preferably 4× to 30× (e.g. 4× to 25×, or 4× to 20×), and most preferably 6× to 25× (e.g. 6× to 15×). Indeed stages may preferably involve a volume increase of no more than 15× (ie. no more than a fifteen-fold volume increase), especially in the production of smaller particles.

The monomer used is a mixture of aminostyrene and styrene and/or a vinylic derivative, e.g. a styrene derivative and optionally a non-styrenic comonomer, e.g. a conventional styrene comonomer. Styrene and styrene derivatives such as alkyl styrenes (e.g. $C_{1-3}$-alkyl styrenes such as o-methyl styrene, m-methyl-styrene, p-methyl-styrene, dimethyl styrene, ethyl styrene, ethyl-methyl-styrene, etc.), halo styrenes (e.g. p-chlorostyrene, bromosytrene or 2,4-dichlorostyrene) and haloalkyl styrenes (e.g. vinyl benzyl chloride), and other conventional or non-conventional styrenes may be used to produce homopolymers or copolymers. In general however styrenes and styrene in particular will preferably be the predominant monomer used for growth from the seed particles.

In the process of the invention aminostyrene (especially 4-amino-styrene) is used as a comonomer, particularly preferably in the final suspension polymerization stage. In this way amine-functionalized particles may be produced directly. Such functionalized particles are particularly suitable for use in solid phase organic syntheses, e.g. of peptides and oligonucleotides and small organic molecules, in separations, e.g. in chromatography, and as compatibilizers. The aminostyrene is advantageously used with the vinylic, especially styrenic, comonomer (e.g. styrene) in a 1:2 to 1:10 weight ratio, especially a 1:2.5 to 1:5 weight ratio.

Other comonomers which may be used include ethylenically unsaturated monomers for example acrylic acids and esters (such as acrylic acid, methyl acrylate, ethyl acrylate, butyl acrylate, methacrylic acid, methyl methacrylate glycidyl methacrylate and ethyl methylmethacrylate), maleic acid and esters thereof (e.g. dimethyl maleate, diethyl maleate and dibutyl maleate), maleic anhydride, fumaric acids and esters thereof (e.g. dimethyl-fumarate and diethyl fumarate), vinyl monomers, and acrylonitrile.

Non styrenic comonomers will preferably make up 0% or 1 to 40% by weight of the polymer added in any growth stage.

The seed particles are preferably of a polymer analogous to or at least compatible with the monomer added during the growth stage for which the polymer seed is used. Thus the Ugelstad seeds are preferably predominantly styrenic polymers, especially on the surfaces thereof. However if the growth polymer is cross-linked, compatibility is less relevant.

Besides simple ethylenic comonomers, comonomers which are capable of cross-linking can also be used, for example divinyl benzene and polyethylene glycol dimethacrylate. Such cross-linkable comonomers will generally be used in relatively small amounts.

Examples of suitable polymerization initiators include organic peroxides such as dibenzoyl peroxide, and lauroyl peroxide, peroxy esters such as t-butyl peroxybenzoate and t-butyl peroxypivalate and azo compounds such as azo bis isobutyronitrile and azo bisdimethylvaleronitrile. These may be used in conventional concentrations (e.g. 0.1 to 10%, preferably 0.2 to 4% by weight relative to the monomer), and are preferably added in solution in the monomer or monomer mixture or in an inert organic solvent, e.g. benzene, toluene or dichloropropane. Where an organic solvent is used, this is preferably in a minor amount relative to the polymer content.

It is preferred to use at least one oil soluble polymerization inhibitor which is disposed in the monomer or monomer mixture in order to prevent polymerization in the seed-free monomer droplets and thereby nucleation of new particles. Such an inhibitor preferably has a high molecular weight (e.g. at least 300 Daltons) and low-water-solubility to reduce diffusion through the water phase. The inhibitor may for example be a phenolic compound (such as 3,5-di-tert-butyl-4-hydroxytoluene, 1,1-bis(4-hydroxyphenyl)cyclohexane, 4,4-butylidene-bis(3-methyl-6-t.butyl phenol), 1,3,5-trimethyl-2,4,6-tris-(3,5-di-t.butyl-4-hydroxybenzyl)benzene (available as Irganox 1330), 2,2'-methylenebis(6-t.butyl-4-methyl phenol), a sulphur compound (such as dilaurylthiodipropionate, 4,4'-thiobis(3-methyl-6-t.butyl-phenol)), or an amine (such as N,N'-di-β-naphthyl-p-phenylenediamine and N-phenyl-N-isopropyl-p-phenylenediamine).

It is preferred to add at least one water-soluble polymerization inhibitor, e.g. potassium iodide, for example to a concentration of 1 to 50 ppm by weight, preferably 3 to 30 ppm, relative to the total mixture. Desirably the inhibitor is added batchwise during the polymerization stage.

The inhibitor is conveniently used in quantities of 0.5 to 10%, preferably 1 to 5% by weight relative to the initiator.

It is also preferred to include one or more stabilizers in the reaction medium. It is particularly preferred to include a suspension stabilizer (i.e. a steric stabilizer) in the aqueous seed suspension and an emulsion stabilizer in the aqueous monomer emulsion which is added thereto. Examples of suitable stabilizers include ionic, ethoxylated ionic, non-ionic and polymeric amphiphilic molecules and inorganic particles, e.g. water-soluble high molecular weight materials, tricalcium phosphate (TCP), celluloses (including cellulose ethers for example hydroxy $C_{1-4}$ alkyl cellulose ethers or (hydroxy $C_{1-4}$ alkyl) $C_{1-4}$ alkyl cellulose ethers, e.g. hydroxyalkyl methylcelluloses such as hydroxypropylmethyl celluloses, available for example as Methocel K-100), polyols, polyvinylalcohols, polyalkylene oxides and inorganic materials such as calcium phosphate and magnesium pyrophosphate. Cellulosic ethers and TCP are preferred as suspension stabilizers, especially for the production of larger sized polymer particles. Preferably such stabilizers are present at 10 to 60% w/w, especially 15 to 55% w/w, relative to the initial polymer seed in any polymerization cycle. For cellulose ethers, the stabilizer concentration is conveniently up to 25% w/w, while for inorganic stabilizers such as TCP the stabilizer concentration is advantageously up to 55% w/w, e.g. 1 to 55% w/w, usefully 10–55% wv, conveniently 30–55% w/w, relative to the initial polymer seed in the polymerization cycle. TCP is especially preferred since it can be used at such high concentrations and/or to produce high solids concentrations and since it has low environmental impact.

The emulsion stabilizers may for example be surfactants, e.g. poloxamers or other polyalkylene oxides such as Tweens. Furthermore emulsion stabilizers such as nonylphenol-polyethylene oxides containing 20 to 150 ethylene oxide units, may be used, e.g. Berol 274 or Igepal CO 990. Alternatively ionic or ethoxylated ionic surfactants may be used. These stabilizers are preferably present in the monomer emulsion, e.g. at concentrations of 0.1 to 2%, preferably 0.2 to 1.0% by weight relative to the monomer content.

Preferably the suspension stabilizer used in the final polymerization stage or stages is an inorganic solid particulate, such as a phosphate (e.g. tricalcium phosphate), which can readily be removed from the product in a washing step. Suspension stabilizers will generally be used at 0.5 to 25% by weight relative to the seed.

Typically seed preparation from smaller seeds may be effected in a reactor (e.g. a 1.5L to 10L autoclave reactor) equipped with stirrer, inlet and outlet ports and temperature controls.

The reactor is charged with initial or later stage seeds, suspension stabilizer, deionized water and when the seed is small (e.g. below 50 μm, especially below 30 μm) preferably also a water-soluble inhibitor such as sodium nitrate. Where an inhibitor is used in the early stages of particle growth this will typically be used at 0.001 to 0.005% by weight concentration in the water.

The seed is typically up to 65% by weight, e.g. 1 to 60%, preferably 10 to 60% by weight of the aqueous suspension and the stabilizer typically 0.5 to 15%, preferably 1 to 10% by weight relative to the seed.

The temperature of the seed suspension is typically raised to about 70 to 100° C., preferably 78 to 92° C. and a monomer emulsion is added.

The monomer emulsion is typically prepared by dissolving the oil-soluble initiator and the oil soluble inhibitor (e.g. dibenzoyl peroxide and Irganox 1330) in the vinylic monomer (or monomer mixture) and mixing with an aqueous solution of an emulsion stabilizer (e.g. Berol 274 or Igepal Co 990). The oil (monomer) phase desirably makes up 30 to 60% by weight of the monomer emulsion which is prepared by any convenient emulsification technique, e.g. by use of a rotor-stator such as an Ultra-Turax.

Insofar as emulsification is concerned it is particularly important for smaller seeds to ensure that the monomer emulsion droplet size is small, and in general it is preferred that the monomer emulsion droplets should be smaller than the seed particles used in any given stage.

Accordingly, it is preferred to form the emulsion by passing the mixture through a pressure homogenizer or plurality of rotor-stator stages. In this way the production of oversized droplets is minimized. Alternatively the mixture may be passed sequentially through a series of separate rotor-stators or repeatedly cycled through a single rotor-stator mixer.

The monomer or monomer emulsion is then conveniently fed continuously into the stirred suspension in the reactor, preferably using an adjustable feed rate pump. The feed rate is preferably kept at 0.1 to 2.0 g, especially 0.15 to 1.0 g and more especially about 0.15 to 0.8 g, particularly 0.15 to 0.6 g, monomer/hour per gram of polymer in the reactor, i.e. the feed rate is preferably increased during the period of addition. Once monomer addition is complete, the reaction mixture is stirred until monomer is exhausted, e.g. for about 2 hours, or polymerization is brought to an end by addition of a chaser (ie. a monomer composition with a high concentration of initiator) or by increasing the reactor temperature. If desired a second polymerization initiator, activated at a higher temperature than the first, may be used.

At the end of each such polymerization stage, particle sizes are preferably determined (using a Coulter counter) and the quantities of monomer used in any subsequent stage calculated accordingly.

Where a polymerization stage is found to produce an undesirably large particle size distribution, the volume size increase should be reduced for subsequent performances of the same growth stage. However the product may still be used for further growth stages if it is graded to remove overly small or overly large particles.

After polymerization is complete, the enlarged particles may be removed and if desired washed to remove undesired stabilizers, initiator etc.

The stability of the polymerization suspension, and the molecular weight of the polymer produced depend on a range of variables (e.g. rate of monomer addition, initiator concentration, temperature, emulsion droplet size, seed size, etc.) in different ways.

Stability requires the avoidance of coagulation. This can typically be assured by ensuring that the monomer concentration in the seed particles does not exceed about 20–25% by weight, more preferably it does not exceed about 10 to 20% and especially preferably it does not exceed about 10% by weight. Avoidance of excess monomer concentration can be achieved by increasing initiator concentration (although this reduces the molecular weight of the polymer formed, the viscosity of the polymer and its glass transition temperature) or by reducing the rate of monomer addition (which increases polymer molecular weight and reaction time). Essentially therefore the operation of the process must balance initiator concentration and monomer addition rate to avoid coagulation and achieve the desired molecular weight within an acceptable process time.

The water contents of the phases may be varied generally without serious problems although if the suspension phase has too low a water content stability may be lost.

Likewise emulsifier, ie. emulsion stabilizer, content is generally not critical, although if too low stability is lost, and if too high micelle formation and hence fines formation may occur. In general the process of the invention may be operated with less than about 1% by weight fines being produced.

From a starting point of typically 10–20 μm Dynospheres®, magnification to particles of for example 200 to 1300 μm mode size may typically be effected in 5 or more stages, e.g.

Stage 1–10 to 40 μm, e.g. 20 to 40 μm
Stage 2–40 to 80 μm
Stage 3–80 to 250 μm, e.g. 80 to 200 μm
Stage 4–200 to 650 μm, e.g. 200 to 400 μm or 250 to 650 μm
Stages 5 et seq.-400 to 2000 μm, e.g. 400 to 600 μm or up to 1300 μm or 650 to 1700 μm If the final product is to be expanded by foaming, it is particularly preferred in the final or penultimate seeded suspension polymerization stage in the process of the invention to incorporate materials which will facilitate subsequent expansion (foaming) of the final product. In this regard waxes, polymers or surfactants or chemical blowing agents or volatile compounds that will form micro-voids in the expandable beads may be introduced in the final or penultimate polymerization stage. The volatile compound should desirably be one which is soluble in the monomer and yet which is a poor solvent for the polymer and which has a boiling point equal or less than the maximum temperature during the polymerization stage. To facilitate micro-void formation, and to reduce the Tg and/or the viscosity of the particle, the particles should desirably be swollen with monomer to a point just short of the sticky state. Examples of appropriate volatile compounds include alkanes, alkenes, cyclic ethers, alcohols and esters with up to 8 carbons preferably 3 to 7 carbons, e.g. pentane, hexane, n-heptane, cyclopentane, methylcyclopentane, 2-methylpentane, tetrahydrofuran, 2-methylbutane, isopropanol, 2-methyl-1-pentene and ethyl acetate.

The following two schemes can be used for introduction of micro-voids:

(A) 1. Disperse seed in water at ambient temperature.
2. Pre-swell with a mixture of monomer (e.g. styrene), polymerization initiator and a volatile compound with a boiling point below 90° C.
3. Maintain at ambient temperature, e.g. for about 60 minutes following onset of addition of the mixture.
4. Heat to 80–90° C.
5. When monomer content in the particles falls below about 10% by weight proceed with addition of remaining amount of monomer and initiator necessary to achieve target size, adding monomer at a rate such that monomer content in the particles does not exceed about 15% by weight.

(B)1–4. As (A) but omitting the volatile compound from the mixture.
5. At the desired polymerization temperature proceed with addition of remaining amount of monomer and initiator necessary to achieve target size, adding monomer at a rate such that monomer content in the particles does not exceed about 25% by weight.
6. When most of the monomer has been added, cool to below the boiling point of the volatile compound and add a solution of the volatile compound in monomer.
7. Heat to 100–120° C. (e.g. 115° C.) under pressure and maintain until residual monomer content in the particles is less than about 5000 ppm (preferably less than 1000 ppm).
8. Cool.

In general, additives (such as the micro-void generating agents mentioned above, waxes, colorants etc.) may be introduced into the particles during the swelling phase and/or during the suspension polymerization stage.

To produce foamed beads, the unfoamed beads must be loaded with a blowing agent, ie. a material which is not a solvent for the polymer or which only slightly swells it and has a boiling point lower than the softening point of the polymer and is in gaseous or liquid form at ambient temperatures or which is a solid capable of generating a gas (e.g. $CO_2$). Typically an optionally substituted aliphatic hydrocarbon having up to 8 carbons, preferably 3 to 5 carbons, and a boiling point in the range −50 to +50° C. is used, e.g. propane, pentane, cyclopentane, cyclobutane, methyl chloride, ethyl chloride, dichlorodifluoromethane (or other Freons), propylene, butylene, etc. Pentane or butane is preferred. The blowing agent is typically added during the final polymerization stage or stages or to the final polymerization product, optionally after recovery, washing, drying, etc. Mixtures of blowing agents can he used.

Control of cell structure during the foaming is an important parameter. As in standard suspension polymer based EPS, cell structure control can be achieved by the addition of various additives. The aim of the additive is to provide, or aid in the formation of, phase transitions within the polystyrene particles. The phase transitions can be in the form of polymer—solid, polymer—liquid or polymer—gas interfaces. Such phase transitions help cell formation and structure during the expansion process. These phase transitions are often observed as circular inclusions within the polystyrene particles. The presence of such circular inclusions into the polystyrene particles has been demonstrated to improve cell structure and expansion of EPS particles. The choice of additives will vary with the effect required. These can be chosen from the following groups of additives: polymers (e.g. polyethylene or crosslinked polystyrene); and surfactants (e.g. compounds having hydrophilic and hydrophobic segments and molecular weight under approximately 2000 Dalton, for example fatty alcohol ethoxylates, sorbitol oleates, etc.)

If desired, the particles may also be treated to attach other materials with a desired property, e.g. functional and reactive chemical groups.

The particles produced by the process of the invention are suitable for use as ion exchange resins. Such resin beads will generally require some degree of cross-linking (e.g. with divinyl benzene) of the polymer matrix and may be further derivatised after bead formation has occurred. Such resins would have the advantage that with repeated use and flushing there would be a lesser tendency towards bead size separation occurring in the resin bed, a problem which leads to reduced performance. In general for ion exchange usage, bead sizes will be about 100 to 500 $\mu$m.

Further examples of applications include use as substrates for the generation of combinatorial chemistry libraries where the substantial monodispersity of the particles gives improved distribution of library members in library generation using split and mix techniques. For this application, the beads may also be reacted post production to introduce a surface functionality appropriate for attachment of the library members. Again bead sizes of 100 to 500 $\mu$m, more especially 50–500 $\mu$m, might typically be used.

The beads produced according to the invention may also be used as carriers for cells, enzymes or catalysts, as carriers for drugs for sustained release formulations, as filters, or as carriers for additives for adhesives.

For many of these uses, a degree of porosity is required for the particles, e.g. when they are for use as catalyst or enzyme carriers. This may be achieved relatively simply by controlling the degree of cross-linking of the polymer matrix and by including a porogen (e.g. toluene, pentane or any other volatile or gas generating agent which is non-reactive with the polymer) in the monomer emulsion used in the final stage or one of the later polymerization stages.

Where desired a porous particle may be loaded, e.g. with drug, catalyst, enzyme or the like, and then provided with a further polymer layer to seal in the load or to delay its release.

The invention will now be described further with reference to the following non-limiting Examples:

EXAMPLE 1

A reactor was charged with 1929 kg of an aqueous suspension of 55 kg 20 $\mu$m polystyrene Dynospheres®, 18 kg of cellulose ether (Methocel K100) (pre-dissolved in water) and 1600 kg water. The suspension was stirred at 40 rpm and heated to 40° C. over ½ hour.

1.0 kg dibenzoyl peroxide (75% in water) was dissolved in 10 kg styrene in a 10L vessel using a conventional propellor as an agitator. After complete dissolution this was charged to the reactor. The suspension was kept at 40° C. for 1 hour then raised to 80° C. over 1½ hours.

A styrene monomer emulsion was prepared by mixing 385 kg styrene, 3.0 kg benzoyl peroxide (75% in water) for 30 minutes. Then 770 kg water and 1.66 kg Tween 20 stabilizer were added and the mixture was emulsified and added to the reactor over 8 hours at rates of 90.75 kg/h, 115.09 kg/h, 133.5 kg/h, 146.3 kg/h, 156.2 kg/h, 165 kg/h, 173 kg/h and 177.5 kg/h for one hour each.

After 10 minutes at 80° C., the reactor was charged with 5 g KI dissolved in 12.5 g water and after 2 hours at 80° C. a further 15 g KI dissolved in 37.5 g water was added.

After the polymerization reaction was complete, the reaction mixture was held at 80° C. for a further 2 hours.

The product was recovered and analysed for particle size-distribution using a Coulter Counter 256.

Mode diameter: 39–41 μm CV: 5–6%

EXAMPLE 2

A reactor was charged with 1929 kg of an aqueous suspension of 50 kg of the 40 μm particles of Example 1, 11 kg of cellulosic ether (Methocel K100), and 1863 kg water. The cellulosic ether was pre-dissolved in water.

The suspension was stirred at 40 rpm and heated to 40° C. over ½ hour.

0.25kg dibenzoyl peroxide (75% w/w in water) was dissolved in 10 kg styrene and mixed in with the suspension. The suspension/emulsion was kept at 40° C. for 1 hour then raised to 80° C. over 1¼ hour.

A styrene monomer emulsion was prepared by mixing 385 kg styrene, 770 kg water, 1.66 kg Tween 20 stabilizer, 0.4 kg Trigonox and 3.0 kg of dibenzoylperoxide (75% in water). This was emulsified and added to the reactor over 8 hours at a rate of 90.75 kg/h (1 hour), 115.09 kg/h (1 hour), 133.50 kg/h (1 hour), 146.26 kg/h (1 hour), 156.14 kg/h (1 hour), 165.38 kg/h (1 hour), 173.04 kg/h (1 hour) and 177.50 kg/h (1 hour). The reaction mixture was then heated 110° C. over 2¼ hours, maintained at 110° C. for 1 hour and then cooled. At the beginning of monomer emulsion addition and 2 hours thereafter 5 g KI in 50 g water was added.

The product was recovered and analysed for particle size distribution.

Mode diameter: 79–81 μm CV: 5–6%

EXAMPLE 3

60 g of polymeric (polystyrene) particles with particle diameter 80 μm (produced analogously to Example 2) was charged into a 3L reactor with 12 g of cellulosic ether (Methocell K100) and 1859 g of water. The cellulosic ether had been dissolved in water the day beforehand.

The mixture was stirred at 320 rpm and heated to 40° C.

1.70 g of 2,2'azobis(2-methylbutylronitrile) was dissolved in 7.34 g of styrene, 0.16 g of divinylbenzene (DVB) (i.e. 80% by weight DVB, 20% by weight ethyl vinyl benzene and other byproducts in DVB production) and 2.50 g of 4-aminostyrene and charged to the reactor. The mixture was stirred at 320 rpm at 40° C. for 1 hour before the mixture was heated to 80° C.

An emulsion was prepared from 265 g of water, 0.57 g of Tween 20, 5.43 g of 2,2'-azobis(2-methylbutyronitrile), 97.25 g of styrene, 2.12 g of divinylbenzene (DVB) (i.e. 80% by weight DVB, 20% by weight ethyl vinyl benzene and other byproducts in DVB production) and 33.13 g of 4-aminostyrene. The mixture was emulsified for 5 minutes using Ultra Turax mixer before being added to the reactor over 6 hours at a rate of 0.60 g/min. the first hour, 0.72 g/min. the second hour, 0.86 g/min. the third hour, 1.04 g/min. the fourth hour, 1.24 g/min. the fifth hour and 1.25 g/min. the sixth hour. The reaction was allowed to continue for 1 hour after the monomer emulsion addition was complete, yielding a suspension of particles with average particle diameter of 107 μm.

The particles were cleaned by washing with methanol and butylacetate. Particle diameter was measured on particles dispersed in water, butylacetate (BuAc) and tetrahydrofuran (THF) respectively giving a volume increase factor of 2.60 in BuAc and 2.73 in THF.

EXAMPLE 4

1380 g of water, 179 g of bis(2-ethylhexyl)adipate, 317 g of acetone and 21 g of sodium dodecyl sulphate (SDS) were homogenized in a two-stage Manton Gaulin homogenizer at 400 kg/cm$^3$ in the first stage and 100 kg/cm$^3$ in the second stage for 10–12 min.

After homogenization 385 g of the emulsion was charged with a seed suspension of monodisperse oligomeric styrene having a particle diameter of 64 μm. 390 g of seed suspension containing 37.7 g of oligomeric particles and 352 g of water was used.

After stirring for 1–2 days at 45° C., 127 g of the seed suspension containing activated seed particles were charged to an emulsion containing 1011 g water, 2.1 g of Methocel K-100, 0.9 g of sodium dodecyl sulphate (SDS), 5.0 g of divinylbenzene (DVB) (i.e. 80% by weight DVB, 20% by weight ethyl vinyl benzene and other byproducts in DVB production), 126 g of styrene, 36.7 g of 4-aminostyrene, and 9.25 g of 2,2'-azobis(2-methylbutyronitrile). The mixture was emulsified for 10 min. using an Ultra Turax mixer.

After swelling at 25° C. for 2 hours, 478 g of water and 4.2 g of Methocel K-100 were charged to the reactor. The dispersion was then polymerized for 1 hour at 60° C. and 10 hours at 70° C., yielding a suspension of particles having diameter of 180 μm.

The particles were purified by washing with methanol and BuAc and their diameter measured when dispersed in water, BuAc and tetrahydrofuran respectively.

EXAMPLE 5

1660 g of water, 216 g of bis(2-ethylhexyl)adipate, 166 g of acetone and 13.3 g of sodium dodecyl sulphate (SDS) were homogenized in a two-stage Manton Gaulin homogenizer at 400 kg/cm$^3$ in the first stage and 100 kg/cm$^3$ in the second stage for 10–12 min.

After homogenization 543 g of the emulsion was charged with 81.5 g monosized styrene particles having a particle diameter of 84 μm. The particles were produced in a manner analogous to Example 2 above.

After stirring for 1–2 days at 45° C., 77 g of the seed suspension containing activated seed particles were charged to an emulsion containing 1064 g water, 2.1 g of Methocel K-100, 1.2 g of sodium dodecyl sulphate (SDS), 4.8 g of divinylbenzene (DVB) (i.e. 65% by weight DVB, rest ethyl vinyl benzene and other byproducts in DVB production), 122 g of styrene, 35.6 g of aminostyrene, and 9.0 g of 2,2'-azobis(2-methylbutyronitrile). The mixture was emulsified for 10 min. by using an Ultra Turax mixer.

After swelling at 25° C. for 1 hour, 479 g of water and 4.2 g of Methocel K-100 were charged to the reactor. The dispersion was then polymerized for 1 hour at 60° C. and 10 hours at 70° C., yielding a suspension of particles having diameter of 200 μm.

The particles were purified by washing with methanol and BuAc and their diameter measured when dispersed in water, BuAc and tetrahydrofuran respectively.

What is claimed is:

1. A process for the preparation of monodisperse amine-functionalised vinyl polymer particles wherein said polymer particles have a mode particle diameter of at least 20 μm, which process comprises
   (a) obtaining a first particulate polymer seed material having a mode particle diameter of no more than 50 μm;

(b) using said first seed material, performing a suspension polymerisation to yield a second particulate polymer seed material having a mode particle diameter greater than that of said first seed material, and using said second seed material, performing at least one further suspension polymerisation to yield a particulate polymer seed material whereby the increase in mode particle diameter in step (b) is at least ×2, wherein at least one of the suspension polymerisations effected in step (b) involves
(i) forming an aqueous dispersion comprising a polymer seed material, a first polymerization initiator of an organic compound which has a molecular weight of less than 5000 Daltons and a water solubility of less than $10^{-2}$ g/L at 25° C., a hydroxyalkylmethylcellulose stabilizer and a first monomer;
(ii) allowing said organic compound to diffuse into the seed material to produce an activated seed material; and
(iii) contacting said activated seed material with a second monomer and with a second polymerisation initiator while effecting suspension polymerisation thereof, and that in at least the final suspension polymerisation of step (b) the monomer comprises amino styrene, and at least one further vinylic monomer and said second polymerisation initiator is an azo compound.

2. A process as claimed in claim 1, wherein said vinyl polymer particles are styrenic polymer particles and said further vinylic monomer is a styrenic monomer.

3. A process as claimed in claim 2, wherein said styrenic monomer is styrene.

4. A process as claimed in claim 1, wherein said first polymerisation initiator is selected from the group comprising organic peroxides, peroxy esters and azo compounds.

5. A process as claimed in claim 1, wherein said organic solvent is acetone or is a portion of said monomer.

6. A process as claimed in claim 1, wherein at least one oil-soluble inhibitor is disposed in said monomer.

7. A process as claimed in claim 1, wherein at least one water-soluble polymerisation inhibitor is present in at least one of said polymerisation steps.

8. A process as claimed in claim 1 wherein seeds for a suspension polymerisation stage are pre-swollen.

9. A process as claimed in claim 8, wherein seed material for a suspension polymerisation is swollen by direct addition of monomer in an amount of from 50 to 200 times the seed weight prior to effecting polymerisation.

10. A process as claimed in claim 8, wherein seeds are pre-swollen with aminostyrene, said further vinylic monomer and, optionally, a third polymerisation initiator.

11. A process as claimed in claim 1, wherein said aminostyrene is 4-aminostyrene.

12. A process for the preparation of monodisperse amine-functionalised vinyl polymer particles wherein said polymer particles have a mode particle diameter of at least 50 μm, which process comprises
(a) obtaining a first particulate polymer seed material having a mode particle diameter of no more than 50 μm;
(b) using said first seed material, performing a first suspension polymerisation to yield a second particulate polymer seed material having a mode particle diameter greater than that of said first seed material and using said second seed material performing a second suspension polymerisation to yield a third particulate polymer seed material and using said third seed material, performing a polymerisation to yield a fourth particulate polymer seed material whereby the increase in mode particle diameter in step (b) is at least ×2; wherein at least one of the suspension polymerisations effected in step (b) involves
(i) forming an aqueous dispersion comprising a polymer seed material, a first polymerisation initiator of an organic compound which has a molecular weight of less than 5000 Daltons and a water solubility of less than 10–2 g/L at 25° C., a hydroxyalkylmethylcellulose stabilizer and a first monomer;
(ii) allowing said organic compound to diffuse into the seed material to produce an activated seed material; and
(iii) contacting said activated seed material with a second monomer and with a second polymerisation initiator while effecting suspension polymerisation thereof, and that in at least the final polymerisation of step (b) the monomer comprises amino styrene, and at least one further vinylic monomer and said second polymerisation initiator is an azo compound.

13. A process as claimed in claim 12, wherein the mode particle diameter is at least 100 μm.

* * * * *